Sept. 26, 1939.   F. GERTH ET AL   2,173,902

COMMON WAVE TRANSMITTER SYSTEM

Filed June 10, 1936

Inventors:
Felix Gerth
and Erich Schulze-Herringen
by R.C. Hopgood
Attorney.

Patented Sept. 26, 1939

2,173,902

UNITED STATES PATENT OFFICE 2,173,902

COMMON WAVE TRANSMITTER SYSTEM

Felix Gerth and Erich Schulze-Herringen, Berlin-Tempelhof, Germany, assignors to C. Lorenz Aktiengesellschaft, Berlin-Tempelhof, Germany Application June 10, 1936, Serial No. 84,436
In Germany March 11, 1935

1 Claim. (Cl. 250—36)

It is well known in common or single wave radio transmitters not to control the secondary transmitter direct from the main transmitter, but to allow it to operate self-excited and to control the synchronism with the main transmitter by means of a device dependent upon phase or frequency. For this purpose a frequency derived from the main transmitter and a frequency derived from the secondary transmitter are conveyed to an adjusting device which responds to a change in the phase position of the two frequencies applied thereto, that is, the frequencies from the main and secondary transmitters, and effects a frequency adjustment of the secondary transmitter if the frequencies of the two transmitters do not coincide. In order to compare the frequencies, a bridge arrangement, for example, is employed. The current taken from the bridge serves to actuate a device by means of which the frequency of the secondary transmitter is adjusted, for example, by displacement of a condenser.

The adjusting device in accordance with the present invention is under the influence of an additional high, non-aperiodic damping and operates without biasing force, in other words has no restoring spring or other mechanism tending to return it to a predetermined position. It has been found that for the perfect operation of single wave transmitter systems such an arrangement is particularly advantageous.

Figure 1:
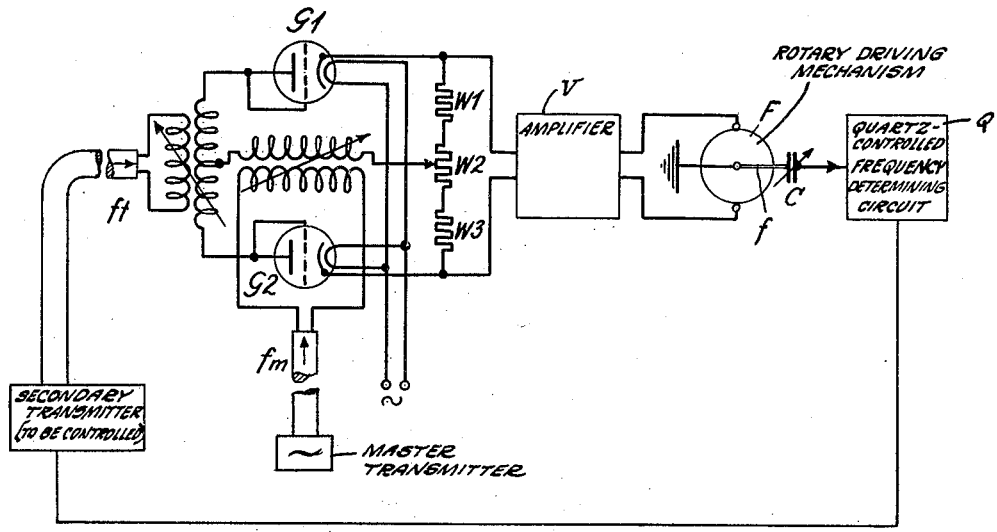
Figure 2:
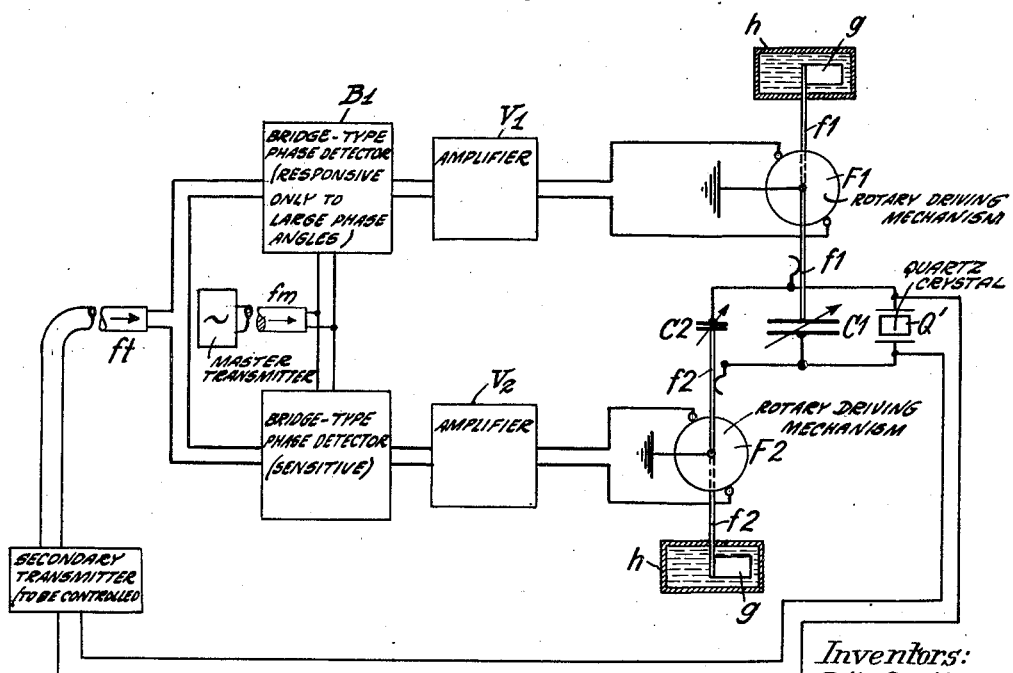

The invention is described in the following description with reference to the accompanying drawing in which Fig. 1 schematically illustrates an arrangement that serves to control the frequency, that is, the phase of the two transmitters, and to adjust the frequency of the secondary transmitter, while Fig. 2 illustrates an alternative embodiment comprising two arrangements like that of Fig. 1.

The arrangement shown in Fig. 1 substantially forms a bridge to which is conveyed over cables the frequency $fm$ from the main transmitter and also the frequency $ft$ from the secondary transmitter. The frequencies conveyed in this way are preferably low frequencies which are obtained by frequency division from the high frequency of the main and secondary transmitters. The bridge arrangement consists of two thermionic or other rectifiers G1, G2 and is completed by resistance W1, W2, W3. Such arrangements are well known per se. As long as the conveyed frequencies are shifted in their phase by 90° with respect to each other, there is no potential on the resistances W1, W2 and W3. As soon, however, as one of the frequencies is changed, so that there is a change of the relative phase position of the two frequencies, a current arises which sets the frequency adjuster F in action over an amplifier V. The frequency adjuster, for example, may consist of a driving system similar to that of an ordinary watt-hour meter. On its axle $f$ is mounted the rotary plate of a rotary condenser C, which influences the frequency of the quartz stage Q of the secondary transmitter and for this purpose, for example, is arranged parallel to the quartz in order to vary its tuning, or parallel to the condenser of the oscillatory circuit in order to influence the tuning of this circuit. It is also possible to vary the intensity of the feed-back or the anode or screen grid potential of the oscillator or control valve, if instead of the condenser another adjusting member, such as a resistance is employed.

The current obtained by the response of the phase bridge, effects, by means of the adjuster F, a change of the capacity C. By means of this change the frequency of the oscillations generated by the stage Q is increased or decreased. With a change of the phase position on the bridge, however, only the phase position is to be adjusted by the device F. For this purpose, in accordance with the invention, the change of the phase position is performed by means of a temporary frequency change of the quartz, in other words, the damping of the adjuster should not be quite aperiodic, that is, it must rise with the current and should have a re-setting force upon the decrease of the current. This type of non-aperiodicity is for convenience hereinafter referred to as "restorational non-aperiodicity" to distinguish it from "overrunning non-aperiodicity" such as would be caused by a flywheel or the like. This adjuster which is provided with such a restorationally non-aperiodic damping will, upon the setting up of a direct current, for example, pass through a certain range of adjustment and upon the relapse of the current will go back to a certain extent.

The degree of damping of the adjuster F prevents, for instance, phase shifts, which occur in the cables, from being transferred to the secondary transmitter. Yet, provided the transmitters upon the insertion of the adjusting device do not differ from each other by more than 1 or 2 cycles, a slow frequency correction of the secondary transmitter takes place in spite of a high degree of damping. If the damping is weak, then it is true that the secondary transmitter becomes corrected even with higher differences, but then cable disturbances have too great an influence.

In order to carry out the invention, it is important that the adjusting device should operate without biasing force or force tending to restore the device to some particular home position. Such restoring force is, for example, avoided by providing that the current intended for the armature coil of the adjuster is conveyed over brushes and sliding contacts or over insulated bearings.

Instead of one adjusting device two may be provided, namely one for coarse adjustment, which becomes effective in response to greater phase differences, and one for fine adjustment, which becomes effective in response to smaller frequency differences. The two adjusting devices are preferably so constructed that the device for coarse adjustment, in the well-known manner per se, provides for the feature that the device serving for the fine adjustment always operates on the most favourable point of its range of operation.

An arrangement of the latter kind is represented in Fig. 2. The frequencies $ft, fm$ are conveyed to two bridge arrangements B1, B2 which are of the same construction as the bridge shown in Fig. 1. Bridge B1 is adjusted for a coarser operation than bridge B2. This adjustment is accomplished by appropriately choosing the detecting elements accordingly and by adjusting the bias voltages in the requisite manner and is such that bridge B2, serving for the fine adjustment, shall always operate on the most favourable point of its range of adjustment. The control current taken from the bridges is subjected to the action of amplifiers V1, V2. Connected to these amplifiers are two frequency adjusters F1, F2. On the axles $f1, f2$ of these adjusters are mounted the movable plates of rotary condensers C1, C2. These condensers are connected in parallel with the quartz crystal Q'. Condenser C1, being for the coarse adjustment, is larger than condenser C2 for the fine adjustment.

The non-aperiodic damping means for the adjusters F, F1, F2 may, for example, consist of a fluid damping device. For instance, vanes on the axles of the adjusters may be immersed in oil, or air damping, eddy current damping or the like may be employed. The axles $f1, f2$, shown in Fig. 2, are provided with a vane $g$, periodically immersed in oil or another suitable liquid contained in a receptacle $h$.

What is claimed is:

A common wave transmitter system comprising a first source of oscillation, a second source of oscillation, phase-sensitive means for producing a current responsive to a departure of the phase relation of the oscillations of said two sources from a predetermined phase angle, movable means for adjusting the frequency of said second source, said movable means being mechanically unbiased so as to be stable in any position, means for actuating said movable means in response to said current from said phase-sensitive means, further phase-sensitive means for producing another current responsive to greater departure of the phase relation of the oscillations of said two sources from a predetermined phase angle, other movable means for adjusting the frequency of said second source responsive to said other current, said last mentioned movable means having a greater frequency adjustment capacity than said movable means first mentioned, and similar restorationally non-aperiodic damping means for both said movable means for exerting resetting forces upon each of said movable means responsive to movement thereof.

FELIX GERTH.
ERICH SCHULZE-HERRINGEN.